(12) United States Patent
Weinberger et al.

(10) Patent No.: US 7,306,171 B2
(45) Date of Patent: Dec. 11, 2007

(54) PLURAL COMPONENT SPRAY GUN FOR FAST SETTING MATERIALS

(75) Inventors: Mark T. Weinberger, Mounds View, MN (US); Richard D. Anderson, Maple Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 10/551,915

(22) PCT Filed: Apr. 8, 2004

(86) PCT No.: PCT/US2004/010640

§ 371 (c)(1),
(2), (4) Date: Oct. 5, 2005

(87) PCT Pub. No.: WO2004/091802

PCT Pub. Date: Oct. 28, 2004

(65) Prior Publication Data

US 2006/0266850 A1    Nov. 30, 2006

Related U.S. Application Data

(60) Provisional application No. 60/461,453, filed on Apr. 9, 2003.

(51) Int. Cl.
*A62C 31/00* (2006.01)

(52) U.S. Cl. ............ 239/398; 239/408; 239/415; 239/433; 239/434.5

(58) Field of Classification Search ............ 239/408, 239/409, 415, 432, 417.5, 433, 434.5, 398
See application file for complete search history.

(56) References Cited

U.S. PATENT DOCUMENTS

| 4,925,101 A * | 5/1990 | Konieczynski et al. ......... 239/8 |
| 4,955,544 A * | 9/1990 | Kopp .......................... 239/304 |
| 6,264,113 B1 * | 7/2001 | Dingler ........................ 239/8 |
| 6,808,310 B2 * | 10/2004 | Ooitsu et al. ................ 384/527 |

* cited by examiner

*Primary Examiner*—Dinh Q. Nguyen
(74) *Attorney, Agent, or Firm*—Douglas B. Farrow

(57) ABSTRACT

A plural component spray gun (10) is designed for spraying quick setting materials such as foams and the like. A mix module (14) plastic material provides at least twice the life with ½ the wear of currently marketed mix modules and is made of poly ether ether ketone reinforced with graphite and PTFE lubricants.

1 Claim, 1 Drawing Sheet

PLURAL COMPONENT SPRAY GUN FOR FAST SETTING MATERIALS

TECHNICAL FIELD

This application claims the benefit of U.S. application Ser. No. 60/461,453 filed Apr. 9, 2003.

BACKGROUND ART

Plural component spray guns for use with fast setting materials have been popular for applying foams and similar materials. While such application devices are generally effective in applying such materials, they are often cumbersome and can require a number of tools and substantial effort to disassemble and clean.

DISCLOSURE OF THE INVENTION

A new mix module plastic material has been discovered that provides at least twice the life with ½ the wear of currently marketed mix modules. The mix module is formed from a material known as KETRON™ PEEK HPV, a poly ether ether ketone reinforced with graphite and PTFE lubricants and available from Quadrant Engineering Plastic Products. This is a substantial advantage over currently known products in the marketplace.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
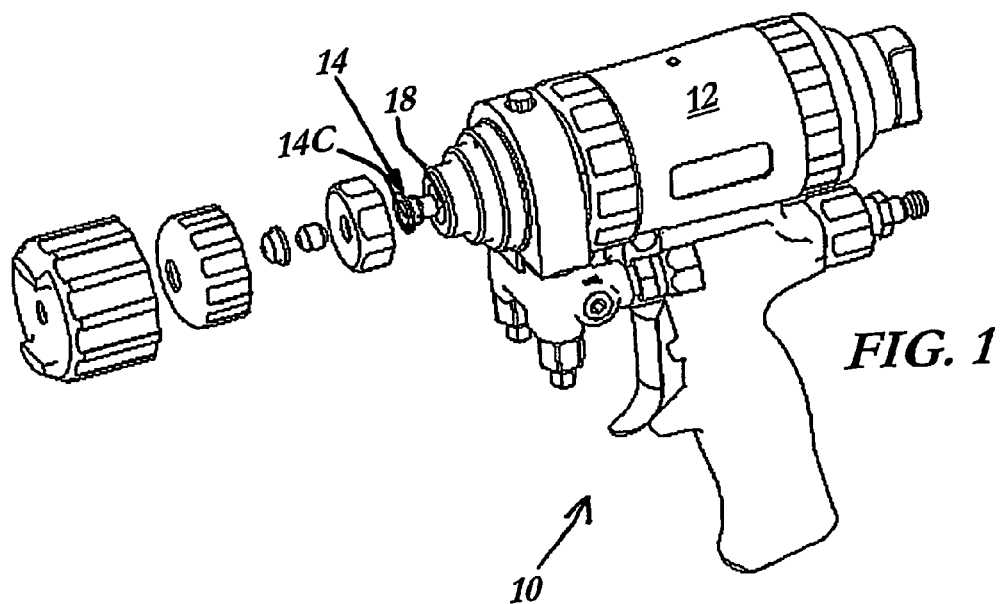
FIG. 1 is a partially exploded perspective view of the spray gun utilizing a mix module of the instant invention.
Figure 2:
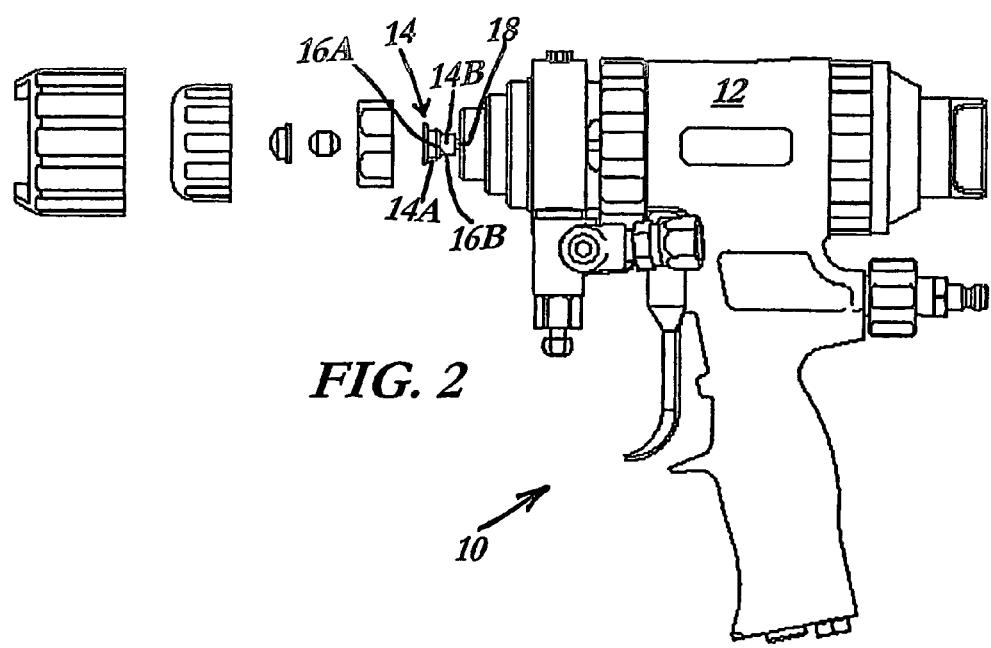
FIG. 2 is a partially exploded side view of the spray gun utilizing a mix module of the instant invention.

The spray gun of the instant invention, generally designated 10, is shown in FIG. 1. Gun 10 is comprised of a gun body 12.

The mix module 14 forms first and second spaced annular chambers 14A and 14B about the periphery thereof and first and second sets of passages 16A and 16B respectively connect said annular chambers 14A and 14B with the interior passage 14C thereof. The first and second sets of passages 16A and 16B enter the interior passage 14C at the same axial location thereby preventing a lead-lag situation which can produce unmixed material. The mix module 14 is formed from a material known as KETRON™ PEEK HPV, a poly ether ether ketone reinforced with graphite and PTFE lubricants and available from Quadrant Engineering Plastic Products. Purge rod 18 is moveable through the central bore 14C of mix module 14.

It is contemplated that various changes and modifications may be made to the spray gun without departing from the spirit and scope of the invention as defined by the following claims.

The invention claimed is:

1. A spray gun for fast setting plural component materials, said spray gun comprising:
   a gun body connectable to first and second sources of plural component materials and having a port for each said component;
   a mix module located in said gun body, said mix module fluidly communicating with said ports and having a central bore for mixing said components, said mix module being constructed of a poly ether ether ketone reinforced with graphite and PTFE lubricants; and
   a purge rod moveable through said central bore.

* * * * *